(No Model.)

L. A. THOMAS.
Lid Support.

No. 235,315.

Patented Dec. 7, 1880.

Witnesses:
Charles C. Stetson
W. C. Dey

Inventor:
Lyman A. Thomas
by his attorney
C. C. Stetson

UNITED STATES PATENT OFFICE.

LYMAN A. THOMAS, OF MIDDLEBOROUGH, MASSACHUSETTS.

LID-SUPPORT.

SPECIFICATION forming part of Letters Patent No. 235,315, dated December 7, 1880.

Application filed May 26, 1880. (No model.)

*To all whom it may concern:*

Be it known that I, LYMAN A. THOMAS, a citizen of the United States, residing at Middleborough, Plymouth county, Massachusetts, have invented certain new and useful Improvements in Lid-Supports, of which the following is a specification.

My invention relates to lid-supports, and will be understood from the following specification and claim.

The object of the invention is to provide a simple inexpensive appliance by which a lid may be secured in a raised position automatically without the manipulation of the hand, which is often inconvenient, if not entirely impossible.

In accomplishing this object I use an arm, pivoted at one end, in connection with a hook acting upon the free end of the arm, which simple contrivances in themselves do the whole work. The arm is preferably curved about half its length near the free end, and has its convexity upward. The straight end of the arm is pivoted to the side of the article on which it is placed, and is provided with a soft elastic washer to give a lateral action and play without being loose on the pivot. The arm is thus attached to the stationary body of the thing upon which it is to be used. At its free end the arm is formed into a bifurcated fork having a long and a short prong, the long one being so placed with relation to the shorter that it will be uppermost when the support is raised with the lid, and will remain in the hook while the shorter drops down. Beneath this end of the arm the article is provided with a rest or protector, upon which the arm falls when released, and by which it is prevented from bruising or injuring the piano, desk, or other article on which it may be attached.

The lid to be supported is provided with a hook, in which the arm slides. The bottom of the hook is lengthened below the groove, and is provided with a hole. The curved portion of the arm slides in the hook as the lid is raised, its curvature preventing it from bearing against the lid at any time. As the lid is raised the arm slides through the hook and the fork at the free end of the arm approaches the hook and the lower short prong falls out of the groove and drops into the hole below.

The accompanying drawings form a part of this specification, and represent what I consider the best means of carrying out the invention, and contain the novel parts, with so much of the ordinary parts as is necessary to show their relation thereto.

Figure 1:
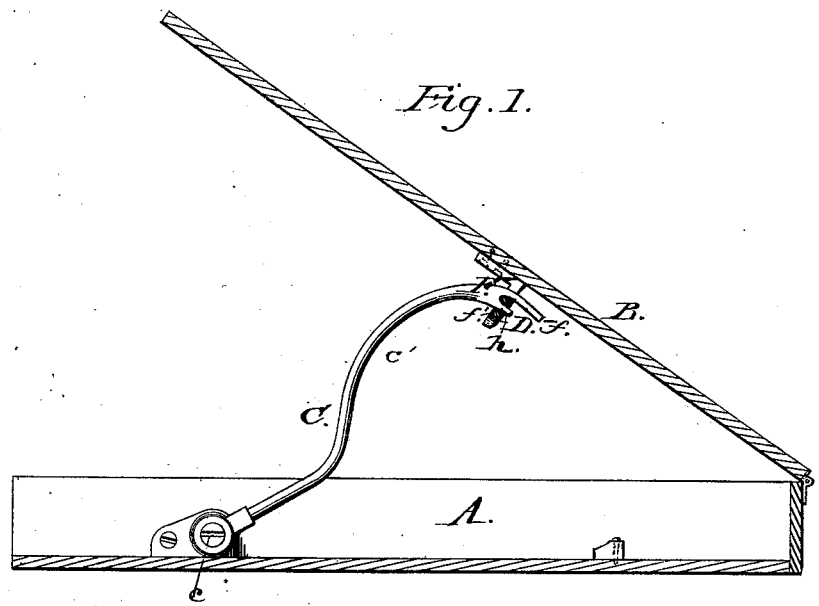
Figure 2:
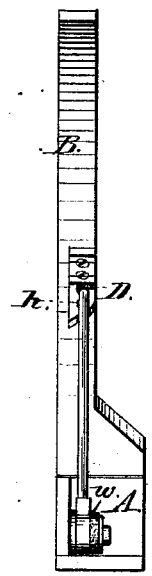

Figure 1 is a view of my device applied with the lid raised. Fig. 2 is a view of the same looking from the front.

Similar letters of reference indicate like parts.

A is the body of the article, to which the arm C is fastened. B is the lid, bearing the hook D. The arm C is pivoted at one end, at $c$, and has on one side the elastic washer $w$, which gives it lateral play. From the pivoted end the arm C extends straight about half its length, where an upward curve is made, as shown at $c'$, extending onto the free end of the arm. At this free end the arm is bifurcated, forming the fork F, which has a long prong, $f$, above and a short prong, $f'$, below.

The hook D upon the lid is placed in such relative position to the arm as that the curved portion $c'$ is continuously in the hook, the curvature in the hook always insuring easy action of the lid, as it never comes in contact with it while being raised, as a straight arm would. The lower portion, beneath the groove of the hook, is lengthened and provided with a tapering hole, $h$. This hole receives the short prong $f'$ of the fork F when the lid is raised. $w$ is the elastic washer. As the lid is raised the hook rises until the arm rests in its groove, where it slides as the lid is further elevated, the curved portion only coming in contact with the hook. The hook, being placed at right angles to the lid, of course assumes an inclination with reference to the body which the lid covers as the latter is raised, the inclination increasing the higher the lid is opened. This inclination, taken in connection with the curvature of the arm, brings the hook and the fork about at right angles when they meet, and as the short prong $f'$ falls out of the groove, gravity will direct it into the hole beneath the groove. Here it is caught and the lid is held securely in place.

On heavy lids two supports or more may be used.

Modifications may be made in many of the details. The arm C may be varied in shape. In some instances it may be curved its entire length. Instead of a rest on the bottom of the case to break the fall of the arm C, a piece of rubber or other material may be inserted in the end of the arm itself to soften the blow.

What I claim is—

The arm C, pivoted at one end, and provided at the other with a bifurcated fork having the long prong $f$ above and the short prong $f'$ below, in combination with the hook D, which is made open, and having a hole, $h$, below the slot, into which the short prong $f'$ drops when the lid is elevated, substantially as set forth.

In testimony whereof I have hereunto set my hand, at Middleborough, this 20th day of May, 1880, in the presence of two subscribing witnesses.

LYMAN A. THOMAS.

Witnesses:
EVERETT ROBINSON,
J. W. P. JENKS.